United States Patent Office.

JOHN GALLEMORE DALE AND EDWARD MILNER, OF WARRINGTON, ENGLAND.

Letters Patent No. 85,796, dated January 12, 1869.

IMPROVED METHOD OF PRODUCING WHITE PIGMENTS FROM LEAD.

The Schedule referred to in these Letters Patent and making part of the same.

*To all whom it may concern:*

Be it known that we, JOHN GALLEMORE DALE, and EDWARD MILNER, of Warrington, in the county of Lancaster, and Kingdom of England, have invented a new and useful Improved Method of Producing White Pigments from Lead; and we do hereby declare that the following is a full and exact description thereof; that is to say, Our invention relates to an improved method of producing white pigments from lead, and consists, First, in taking the oxides of lead, commonly known as litharge and massicot, and treating them, in a finely-ground state and under constant agitation, with a solution of a chloride of the alkalies or alkaline earths. After one or two days' contact, we obtain an exceedingly white and flocculent compound, which, after being washed from any adhering soluble saline matter, is in a state to be used, as hereafter described in the third part. We do not bind ourselves to any particular proportions of litharge and chloride salt, but we may state that we find a mixture of sixty parts of water with ten parts of litharge and one part chloride of sodium, barium, or calcium, to answer well.

Secondly, instead of the process above described, we prepare hydrated oxide of lead by any of the well-known methods, that is to say, by the solution of lead-ores, litharge, or metallic lead, in any suitable acid, and subsequent precipitation by an alkali or alkaline earth. For instance, the ordinary lead-ore, known as galena, may be dissolved in hydrochloric acid, and the hydrated oxide of lead fully precipitated from the resulting chloride by lime; or sulphate of lead, obtained as a bye-product in several manufacturing-processes, may be treated with soda or any suitable alkaline solution, whereby it is decomposed, and the hydrated oxide of lead is produced. The hydrated oxide of lead, by whatever process prepared, after being freed, by washing, from any soluble saline matter, is ready to be treated as next described.

Thirdly, we now take the compound, made as described in our first part, hydrated oxides of lead, or mixtures of any proportion of them, and add sufficient water to form a thin paste, which is put into a suitable vessel, either with the addition of from one to five per cent. of acetic acid or acetate of lead, nitric acid or sub-nitrate of lead, or not, as may be found desirable, the said vessel being closed, and fitted with machinery to keep the mixture in constant agitation. Carbonic acid is now passed into this vessel, either under pressure or otherwise, when it is rapidly absorbed, and the whole mass, or nearly so, after the lapse of three or four days, will be found converted into carbonate of lead, possessing great body and opacity. When the conversion is deemed complete, it is well washed, and, if necessary, ground and levigated, to free it from any undecomposed litharge, which may be again treated as before described. The levigated pigment is then dried, and may be used for any of the purposes for which the so-called white lead of commerce is applicable.

We claim—

1. The treatment of the material obtained as specified in the first part, (which is a very basic chloride of lead,) with carbonic acid preferably in conjunction with small quantities of either acetic acid, acetate of lead, nitric acid, or nitrate of lead. The pigment obtained is a chlorocarbonate of lead, the amount of chlorine in combination being determined by the quantity of saline or earthy chloride used in the first treatment of the lead oxides.

2. The treatment of pure hydrated oxide of lead, by whatever process obtained, with carbonic acid, preferably in conjunction with either acetic acid, acetate of lead, nitric acid, or nitrate of lead, whereby a pigment answering to the ordinary white lead of commerce is obtained, or a pure monocarbonate, according to the length of time the mixture is exposed to the action of the carbonic acid.

3. Any mixture of the aforementioned basic chloride and hydrated oxide of lead, before treatment with carbonic acid, or any mixture of the finished compounds to be used as pigments that may be found desirable.

Done at Manchester, England, this 30th day of September, A. D. 1868.

JOHN GALLEMORE DALE.
EDWARD MILNER.

Witnesses:
  G. SEPTIMUS HUGHES,
    Patent Agent,
      11 *Blackfriars Street, Manchester.*
  CHAR'S WM. COLLINS,
    11 *Blackfriars Street, Manchester.*